United States Patent [19]

Dell

[11] 4,264,371
[45] * Apr. 28, 1981

[54] ROOM TEMPERATURE SEAM MIX

[75] Inventor: M. Benjamin Dell, Pittsburgh, Pa.

[73] Assignee: Aluminum Company of America, Pittsburgh, Pa.

[ * ] Notice: The portion of the term of this patent subsequent to Sep. 11, 1996, has been disclaimed.

[21] Appl. No.: 60,016

[22] Filed: Jul. 23, 1979

Related U.S. Application Data

[63] Continuation-in-part of Ser. No. 449,592, Mar. 11, 1974.

[51] Int. Cl.$^3$ ............................................. C08L 95/00
[52] U.S. Cl. ................................................... 106/284
[58] Field of Search ....................... 106/284; 204/294

[56] References Cited

U.S. PATENT DOCUMENTS

| | | | |
|---|---|---|---|
| 3,020,220 | 2/1962 | Helling et al. | 204/67 |
| 3,576,700 | 4/1971 | Dell | 428/54 |
| 4,167,419 | 9/1979 | Dell | 106/284 |

FOREIGN PATENT DOCUMENTS 386224 9/1973 U.S.S.R. .

Primary Examiner—Theodore Morris
Attorney, Agent, or Firm—Glenn E. Klepac

[57] ABSTRACT

A mix suitable for room temperature application which, on baking, forms a liquid-tight, electrically conductive seam between adjacent carbon blocks in an electrolytic cell for producing aluminum. The seam mix comprises carbon aggregate calcined to contain less than about 1.5% volatile matter, coal tar pitch or petroleum pitch binder, and an aromatic hydrocarbon solvent. A preferred composition of the seam mix has been found to exhibit less than two percent shrinkage upon heating to 950° C.

8 Claims, No Drawings

ROOM TEMPERATURE SEAM MIX

CROSS-REFERENCE TO RELATED APPLICATION

This application is a continuation-in-part of copending application Ser. No. 449,592, filed Mar. 11, 1974.

BACKGROUND OF THE INVENTION

The present invention relates to an improved mix of carbon aggregate and binder. More particularly, it relates to a seam mix applicable at room temperature for forming fluid-tight, electrically conductive seams between carbon blocks in the bottom of a Hall-Heroult cell for producing aluminum metal by the electrolysis of $Al_2O_3$.

Background material on the technique of using seam mixes in the construction of Hall-Heroult cells is given in U.S. Pat. No. 2,378,142, issued June 12, 1945, to Hurter for a "Method for Making Furnaces for the Electrolytic Production of Aluminum" and in U.S. Pat. No. 3,576,700, issued Apr. 27, 1971, to M. B. Dell for "High Strength Joined Porous Block Structure and Method of Making Same". The seams are referred to in the Hurter patent as "interspaces".

According to the present method of seam mix usage in the construction of Hall-Heroult cells, prebaked cathode blocks of carbon are arranged in a cell bottom, separated by seams one to three inches wide. To obtain optimum properties, e.g. high density in the seam, conventional practice has been to preheat the carbon blocks to 60° to 130° C. with hot, for example, 130° C., seam mix then being incrementally tamped into the seams and between the cell side lining and the blocks to provide a smooth cell bottom.

This practice is disadvantageous for a number of reasons. Fumes are evolved from the heated mix. Considerable manpower and coordination are needed to achieve the placement of the hot seam mix between the heated blocks before the mix has had a chance to cool. The elevated temperatures mean discomfort for the people performing the work. In addition, significant capital and operating costs are associated with the preheating of both the blocks and the seam mix.

A composition used for making molded carbon bodies but which has no utility as a room temperature seam mix is described in Greaves et al U.S. Pat. No. 2,637,072. The Greaves composition includes coal not subjected to calcining and containing 10–15% volatile matter, thereby resulting in excessive shrinkage upon heating to 950° C. (see Example III below). A preferred formula for the Greaves carbon bodies contains coal tar pitch having a softening point of 105° C. and is molded at a temperature of 100° C., rather than at room temperature.

SUMMARY OF THE INVENTION

In view of the problems which have been associated with seam mixes typified by application at elevated temperatures, it is an object of the present invention to provide a mix which can be applied without the application of heat; the temperature of the mix during application being simply that of the room in which the aluminum-producing cell or other device is located.

This, as well as other objects which will become apparent in the discussion that follows are achieved according to the present invention by providing a mix suitable for use as a seam mix in a electrolytic cell for producing aluminum comprising calcined carbon aggregate, a binder and a solvent having a boiling point of from 150° to 350° C. and comprising at least one compound selected from the group consisting of unsubstituted aromatic hydrocarbons and substituted aromatic hydrocarbons having only saturated side chains, the solvent being present in an amount sufficient to render the mix capable of being tamped without application of heat.

In a preferred embodiment of the invention, the boiling point of the solvent is from 200° to 300° C.

As used herein, the term binder includes pitch obtained from coal tar and the similar products obtained from petroleum.

DESCRIPTION OF THE PREFERRED EMBODIMENTS

I have discovered that a very serviceable seam mix capable of being applied at room temperature can be produced if a seam mix which gives good service, provided it is applied hot, is modified to contain an amount of crude methyl naphthalene solvent sufficient to make it capable of application at room temperature. As used herein and unless indicated otherwise, the term "crude methyl naphthalene solvent" is typically in weight-%:

23%±15% naphthalene
56%±15% alpha and beta methyl naphthalene
21%±15% dimethyl naphthalene, where the sum of the percentages of naphthalene, alpha and beta methyl naphthalene and dimethyl naphthalene is essentially 100%. Such crude methyl naphthalene solvent can of course be prepared by mixing measured amounts of its component chemicals, but its cheaper source is in the form of a distillate fraction from the chemical oil derived from coke-oven tar. See, for example, Chapter 5 entitled "Recovery of Coal Chemicals" in *The Making, Shaping and Treating of Steel,* published by United States Steel Corporation, 7th edition (1957), or Chapter 12 entitled "Coal Tar" in *Coal, Coke, and Coal Chemicals* by Philip J. Wilson, Jr. et al, published by the McGraw-Hill Book Company, Inc., first edition (1950).

The solvent may contain impurities such as those which occur when manufacture is by coal tar distillation, such impurities include sulfur compounds such as thiophene, oxygen compound such as phenols, and nitrogen compounds, both ring and side-chain nitrogen compounds such as pyridine and amino benzene.

In preparing the mix of the present invention, I first assemble the ingredients of a hot application mix. These ingredients will be essentially carbon aggregate as one part and binder as the other. The binder is usually coke-oven pitch, but it may be petroleum binder.

My next step is to mix the binder and crude methyl naphthalene solvent together. The mixed binder and solvent is then poured into an unheated mixer which already has the carbon aggregate in motion. The mixing is continued until a uniform coating of the carbon aggregate with the binder-solvent combination has been obtained.

The binder component occurring in hot application seam mixes is, for example, the residue (called "pitch") of coal tar distillation, the technology of which is discussed in the above-mentioned chapters in *The Making, Shaping and Treating of Steel* and in *Coal, Coke, and Coal Chemicals.* Pitches are characterized by their "softening point", which parameter is determined by the "cube-in-air" method described in ASTM D-2319 entitled "Softening Point of Pitches".

The carbon aggregate is typically anthracite which has been calcined to drive off its volatiles. The calcined carbon aggregate should be calcined to contain less than about 1.5% by weight volatile matter on a dry, ash-free basis. In a preferred embodiment of the invention, the carbon aggregate is anthracite calcined at 1300° C. to contain essentially no (less than about 0.5%) volatile matter on a dry, ash-free basis. The carbon aggregate should contain as little volatile matter as possible in order to minimize shrinkage of the green seam mix upon baking in an electrolytic cell.

A preferred mix composition according to the present invention consists essentially of
(1) 7 to 17 weight-percent binder of softening point of 48° to 54° C. and carbon aggregate at a weight-percent of quantity 100 minus the weight-percent of the binder, and
(2) crude methyl naphthalene solvent at 8 to 16%, more preferably 10 to 14%, of the weight of the binder.

The relationships in this preferred mix composition may be alternatively expressed mathematically as follows: Where X is the weight of binder and Y is the weight of aggregate, the quantity $$\frac{X}{X+Y} \cdot 100$$

may range between 7 to 17%, while the percentage of aggregate may range between $$100 \left(1 - \frac{X}{X+Y}\right),$$

with the amount of solvent ranging from 8 to 16% of X.

Further illustrative of the present invention are the following examples:

EXAMPLE I

A mix according to the invention was used to repair a "pot hole" in a Hall-Heroult cell which appeared to have reached the end of its service life so that relining would soon be necessary. The pot hole was a hole between cathode blocks where the original seam had eroded away so that metal was tapping out of the cell. The cell was emptied of its liquid contents and allowed to cool down. The metal which solidified in the pot hole was dug out. The dug-out location was filled in with seam mix of the present invention. The particular seam mix contained 88 weight-percent aggregate and 12 weight-percent pitch of about 50° C. softening point. This pitch was compounded by mixing 13.5 weight-percent of 110° C. softening point pitch and 86.5 weight-percent of 40° C. softening point pitch. The aggregate was calcined anthracite and had the particle size distribution given in Table I. In the table, "$-\frac{3}{8}+4$", for example, means particles which pass through a $\frac{3}{8}$ inch screen, Tyler series, and yet are retained on a No. 4 screen.

TABLE I

| Calcined Anthracite Particle Size Distribution | |
|---|---|
| Particle Size | Weight-% |
| $+\frac{3}{8}$ | 2.7 |
| $-\frac{3}{8} + 4$ | 10.7 |
| $-4 + 8$ | 13.4 |

TABLE I-continued

| Calcined Anthracite Particle Size Distribution | |
|---|---|
| Particle Size | Weight-% |
| $-8 + 14$ | 10.2 |
| $-14 + 28$ | 12.6 |
| $-28 + 48$ | 15.8 |
| $-48 + 100$ | 11.9 |
| $-100 + 200$ | 10.6 |
| Pan | 12.2 |

The pitch was heated to 75° C. and then a quantity of crude methyl naphthalene solvent equaling 10% of the weight of the pitch was stirred into the pitch. The particular crude methyl naphthalene solvent used was provided by the Koppers Company, Inc. of Pittsburgh, Pa., under the designation "Methyl Naphthalene Fraction", which typically analyzes in weight-percent as 12% naphthalene, 55% alpha and beta methyl naphthalene and 33% dimethyl naphthalene. Additional specifications of this product are provided in Table II.

TABLE II

| Additional Parameters for Exemplary Solvent | |
|---|---|
| Parameter | Value |
| Distillation: 5% Point | Not below 232° C. |
| Distillation: 95% Point | Not below 255° C. |
| Specific Gravity at 15.5/15.5° C. | 1.010–1.030 |
| Tar Acids | 2.0% maximum |
| Tar Bases | 2.0% maximum |
| Water | 0.5% maximum |
| Flash Point Cleveland Closed Cup | 204° F. |

The aggregate was placed in a mixer, the mixer turned on and, with the mixer blades in motion, the solvent-pitch mixture was added. Mixing was continued until the aggregate appeared to have a uniform distribution of the pitch-solvent mixture. No attempt was made to heat the mixer or the aggregate. The resulting mix was transported to the site of the Hall-Heroult cell which was to be repaired. Before tamping the mix into the pot hole, the sides of the pot hole were painted with a pre-coat of warmed pitch characterized by its having a softening point of 130° C. The seam mix was packed in successive layers into the dug-out pot hole using first a frame-mounted rammer and then a manual rammer for finishing the uppermost layer. With the seam mix well tamped into the pot hole, the cell was placed on preheat for 8½ hours, using a two-burner flame heater. The temperature of the mix at the end of this time was 125° C., that temperature being reached at approximately four to five hours into the preheat time. The cell was started for the electrolysis of $Al_2O_3$ approximately nine hours after the preheat had been terminated and was probed approximately 30 days after start-up. The probing indicated that the repair was still in good condition. The cell was operated at least over a ten-month period and showed no high iron content in the aluminum metal product. The presence of a high iron content would be an indication that the repair was leaking.

An alternative solvent to be included in the seam mix of the invention is sold by Crowley Tar Products Company of New York, N.Y. under the designation "Methyl Naphthalene Grade LG". This product on analysis typically conforms to the specification outlined below.

Specific Gravity, 15.5° C. .973 g/cc

-continued

| Distillation, ASTM D-850 | |
|---|---|
| First Drop | 195° C. |
| 5 vol.% | 205° C. |
| 95 vol.% | 262° C. |
| Chromatographic Analysis, wt. % | |
| Light Ends | 19.4% |
| (primarily alkylated benzenes) | |
| Naphthalenes | 62.8% |
| Heavy Ends | 17.8% |
| Composition of Naphthalenes | |
| Naphthalene | 14.4% |
| 2-Methyl naphthalene | 23.0% |
| 1-Methyl naphthalene | 12.3% |
| Dimethyl naphthalenes | 13.1% |

EXAMPLE II

In a mixer at room temperature, a mix was prepared using 13 weight-percent pitch, softening point equals 52° C., and 87 weight-percent aggregate and the crude methyl naphthalene solvent of Example I, present at 12% of the weight of the pitch. This mix was used as seam mix in the construction of a new aluminum-production cell. No precoat was placed on the carbon blocks. The carbon blocks were at room temperature, and the mix was tamped in also at room temperature. The room temperature was 25° C. While the simple preheat procedure described in Example I was sufficient for that particular cell since it had already seen an extended period of operation, in this case of a new cell, the carbon blocks and the seam mix tamped between them were slowly heated in a substantially inert atmosphere for several hours to a temperature of 900° to 1000° C.

While the above examples use solvent at 10% and 12% of the weight of the pitch, baking shrinkage tests show that solvent contents at from 8% to 16% of the weight of the pitch will provide successful room temperature seam mixes according to the invention.

EXAMPLE III

The formula disclosed in column 3, lines 10-38 of Greaves et al U.S. Pat. No. 2,637,072 was tested for suitability as a seam mix when applied at 100° C. and at room temperature. Ingredients used are as follows:

| Ingredient | Weight-% |
|---|---|
| Lump coal containing 13.2% by weight volatile matter on a dry, ash-free basis | 80 |
| Coke-oven pitch (softening point = 110° C.) | 14 |
| Naphthalene oil (B.P. 250°-290° C.) | 6 |

The pitch and naphthalene oil were preblended at 125° C. A 2400 gram mix was made in a laboratory sigma-blade blender. Two batches of specimens, each 51 millimeters in diameter, were pressed. The first batch was pressed at a mold temperature of 100° C. with the mix at 70° to 75° C. as specified in Greaves. The second batch was pressed after cooling to room temperature in a mold at room temperature, as specified for the room temperature seam mix of the present invention.

The green test samples were measured. They were then packed in coke and baked in accordance with the following schedule: 20° C. per hour to 550° C.; 50° C. per hour to 950° C. and 10 hours at 950° C.

Results of the baking shrinkage tests on the Greaves formula are summarized as follows:

| Mix Temperature | Mold Temperature | Volume Shrinkage on Baking |
|---|---|---|
| 70-75° C. | 100° C. | 25.8% |
| Room Temperature | Room Temperature | 25.4% |

Baking shrinkage of this mix was very high and is in substantial agreement with the value reported in column 3, line 35 of the Greaves patent. In contrast, when the seam mix of the present invention is tested under the same conditions, volume baking shrinkage has been found to be consistently less than two percent and typically about one percent. See M. B. Dell, "A Nonfuming Room Temperature Seam Mix for Carbon Linings in Smelting Cells", MET. TRANS. 8B, pp. 509-511 (1977).

The Greaves composition is clearly not suitable for use as a seam mix in electrolytic cells for manufacturing aluminum because on baking, a gap would open up between the seam and carbon block, thereby permitting bath to escape. This "early leaker" problem is overcome by using a seam mix having a baking shrinkage of less than two percent.

The present invention has the particular advantage of permitting the use of pitches of higher softening point than previously commonly used in seam mixes, since now tamping can be carried out at room temperature. Increased softening point and concomitant higher coking value mean superior carbon bodies.

Besides being useful as a seam mix, the mix of the present invention in its broader aspects is suitable as a peripheral mix, i.e. as a mix for filling in around the array of carbon blocks in an aluminum production cell, and as a mix for producing a monolithic carbonaceous layer having a low baking shrinkage, in which case no carbon blocks are used. The mix of the invention can be used both for new cell construction and for the repair of old cells. Additionally, it is not limited to application only in the aluminum industry; for example, it can, in its broader aspects, be applied generally in any application where it is required to produce high density, carbonaceous components having low baking shrinkage.

It will be understood that the above description of the present invention is susceptible to various modifications, changes and adaptations, and the same are intended to be comprehended within the meaning and range of equivalents of the appended claims.

What is claimed is:

1. A mix suitable for forming a liquid-tight, electrically conductive seam between adjacent carbon blocks comprising
   (a) about 83 to 93 parts by weight carbon aggregate calcined to contain less than about 1.5% volatile matter on a dry, ash-free basis;
   (b) about 7 to 17 parts by weight binder in the form of coal tar pitch or petroleum pitch; and
   (c) a solvent selected from the group consisting of unsubstituted aromatic hydrocarbons having boiling points of about 150° to 350° C. and substituted aromatic hydrocarbons having only saturated side chains and boiling points of about 150° to 350° C., said solvent being present in an amount sufficient to render the mix capable of being tamped without application of heat, said amount being less than the weight of the binder.

2. The seam mix of claim 1 wherein said carbon aggregate is calcined to contain less than about 0.5% volatile matter on a dry, ash-free basis.

3. The seam mix of claim 1 wherein said carbon aggregate is calcined to contain essentially no volatile matter.

4. The seam mix of claim 1 wherein the solvent has a boiling point of about 200° to 300° C.

5. The seam mix of claim 1 wherein the solvent is present at about 8% to 16% of the weight of the binder.

6. The seam mix of claim 1 wherein said side chains are selected from the group consisting of methyl and ethyl.

7. The seam mix of claim 1 wherein said binder is pitch having a softening point of about 48° to 54° C.

8. The seam mix of claim 1 wherein said carbon aggregate comprises about 88 parts by weight calcined anthracite, said binder comprises about 12 parts by weight pitch having a softening point of about 48° to 54° C., and said solvent is present at about 1.2 parts by weight.

* * * * *